US012808739B2

(12) United States Patent
Brown

(10) Patent No.: US 12,808,739 B2
(45) Date of Patent: Nov. 24, 2026

(54) PRESSURE SENSOR AND A RETROFIT KIT FOR PRESSURE SENSORS

(71) Applicant: MEKOROT WATER COMPANY LTD., Tel-Aviv (IL)

(72) Inventor: Gal Brown, Tzur Yial (IL)

(73) Assignee: MEKOROT WATER COMPANY LTD, Tel-Aviv (IL)

( * ) Notice: Subject to any disclaimer, the term of this patent is extended or adjusted under 35 U.S.C. 154(b) by 296 days.

(21) Appl. No.: 18/578,020

(22) PCT Filed: Jul. 25, 2022

(86) PCT No.: PCT/IL2022/050798
§ 371 (c)(1),
(2) Date: Jan. 10, 2024

(87) PCT Pub. No.: WO2023/007485
PCT Pub. Date: Feb. 2, 2023

(65) Prior Publication Data
US 2024/0377274 A1 Nov. 14, 2024

Related U.S. Application Data

(60) Provisional application No. 63/225,582, filed on Jul. 26, 2021.

(51) Int. Cl.
*G01L 19/06* (2006.01)
*F16L 41/00* (2006.01)
(Continued)

(52) U.S. Cl.
CPC ........ *G01L 19/0627* (2013.01); *F16L 41/008* (2013.01); *G01L 9/0041* (2013.01);
(Continued)

(58) Field of Classification Search
CPC ............... G01L 19/0627; G01L 9/0041; G01L 19/0007; G01L 19/0023; G01L 19/003;
(Continued)

(56) References Cited

U.S. PATENT DOCUMENTS 4,840,068 A * 6/1989 Mayhew, Jr. ....... G01L 19/0023 73/706
5,212,989 A * 5/1993 Kodama ............. G01L 19/0645 73/756
(Continued)

FOREIGN PATENT DOCUMENTS

CN 2090980 U * 12/1991
JP 2018189642 A * 11/2018 ........... G01L 9/0052

OTHER PUBLICATIONS

CN-2090980-U, English Translation (Year: 1991).*
JP-2018189642-A, English Translation (Year: 2018).*

*Primary Examiner* — Ryan D Walsh
(74) *Attorney, Agent, or Firm* — The Roy Gross Law Firm, LLC; Roy D. Gross

(57) ABSTRACT

The present invention provides a pressure sensor configured to measure the pressure of a substance. A novel elastomeric conduit is used for immersion into the substance being measured. The conduit is formed of a flexible material that prevents residue buildup upon an external diaphragm of the pressure sensor. The invention additionally provides kits for retrofitting pressure sensors.

15 Claims, 5 Drawing Sheets

(51) Int. Cl.

| | |
|---|---|
| ***G01L 7/08*** | (2006.01) |
| ***G01L 9/00*** | (2006.01) |
| ***G01L 13/02*** | (2006.01) |
| ***G01L 19/00*** | (2006.01) |
| ***G01L 19/14*** | (2006.01) |

(52) U.S. Cl.

CPC ...... *G01L 19/0007* (2013.01); *G01L 19/0023* (2013.01); *G01L 19/003* (2013.01); *G01L 19/0038* (2013.01); *G01L 19/0046* (2013.01); *G01L 19/0645* (2013.01); *G01L 19/149* (2013.01); *G01L 7/08* (2013.01); *G01L 13/025* (2013.01)

(58) Field of Classification Search

CPC ............. G01L 19/0038; G01L 19/0046; G01L 19/0645; G01L 19/149; G01L 7/08; G01L 13/025; F16L 41/008

See application file for complete search history.

(56) References Cited

U.S. PATENT DOCUMENTS

| | | | | |
|---|---|---|---|---|
| RE38,557 | E * | 7/2004 | Englund | G01M 3/3281 73/756 |
| 2012/0048038 | A1 * | 3/2012 | Furlong | G01L 19/0007 73/866.5 |
| 2013/0047737 | A1 * | 2/2013 | Vagle | G01L 19/0645 29/426.5 |
| 2019/0335980 | A1 * | 11/2019 | McHugh | A61B 5/02141 |
| 2022/0049994 | A1 * | 2/2022 | Cavanaugh | G01L 19/0645 |
| 2022/0307931 | A1 * | 9/2022 | Hasunuma | G01L 7/084 |

* cited by examiner

PRESSURE SENSOR AND A RETROFIT KIT FOR PRESSURE SENSORS

FIELD OF THE INVENTION

The present invention relates to a device and retrofit kit, for measuring the pressure of a material. The invention is especially useful for measuring the pressure of a flowing substance.

BACKGROUND

Pressure sensors are typically used in pipes and conduits to measure the absolute or relative pressure of a fluid or gas in the pipe. Measurement of the pressure in the pipe is critical for monitoring pipe integrity, and fluid/gas flow. The pressure is measured either during flow, or in the absence of flow.

U.S. Pat. No. 5,212,989 describes a pressure sensor used in an automobile internal combustion engine. The pressure sensor includes a flush mounted element on the inner side of a pipe. The flush mounted element includes a flexible member, and a non-compressible fluid, in contact with the flexible member and the pressure sensor. The flexible member deforms under the pressure of the liquid in the pipe. The non-compressible liquid transmits the pressure to the pressure sensor, which detects the pressure of the non-compressible fluid.

Reference is made to Prior Art FIG. 1, showing a schematic cross section of a prior art flush-mounted fluid or gas pressure sensor. The flush mounted sensor comprises a sensor body (101), an internal diaphragm (103), an external diaphragm (107), and a mounting tube (105). A non-compressible liquid (113) is contained in the mounting tube (105), between and contacting the internal diaphragm (103) and the external diaphragm (107). The external diaphragm (107) is flush mounted upon a fluid-containing or gas-containing pipe (109) so that the diaphragm (107) is in contact with the fluid or gas (111) to be measured. Any pressure that is exerted by the fluid or gas (111) in the pipe (109), is conveyed via the external diaphragm, and is transferred by the non-compressible fluid (113) to the internal diaphragm (103). Deformation of the internal diaphragm (103) is then measured, using optical, electronic, or mechanical means; the pressure of the fluid or gas (111) in the pipe (109) is related to the measured deformation of the internal diaphragm (103).

Over time, especially when turbid fluids are measured, sediment tends to build-up on the external diaphragm (107) such as that of the U.S. Pat. No. 5,212,989 sensor or similar sensors. Deposits that collect upon the flush-mounted flexible member, reduce its functionality and reliability. Non-limiting examples of turbid materials being measured, that tend towards sediment deposit, include sludge, oils, solar fluids, and other particulate materials.

The need exists for an improved pressure sensor for pressure measurement, that may be used in any liquid, gas, or viscous material. The pressure sensor should prevent residue buildup on the external diaphragm, when used to measure pressure of materials that are corrosive, or are turbid (containing sludge or contaminants).

The present invention overcomes the limitations of the existing art. The invention provides pressure sensors and retrofit kits for pressure sensors, that continuously function even in turbid environments; and prevent scum accumulation that would interfere with pressure measurement. These and other advantages of the invention are described in the Detailed Description of the invention that follows.

SUMMARY

In a general overview of the invention, the present invention provides a pressure sensor, and a retrofit kit for a pressure sensor, that resolve the prior art problem of residue buildup on the external diaphragm that contacts the material being measured; thus, the invention is capable of functioning over an extended length of time.

The invention provides a pressure sensor configured to measure the pressure of a material, the pressure sensor comprising:

a) a housing, enclosing a pressure measuring mechanism and a display;

b) a rigid external tube, filled with a non-compressible fluid;

c) a deformable internal diaphragm having a first side in contact with the pressure measuring mechanism and a second side in contact with the non-compressible fluid;

d) a lengthened elastomeric conduit, having an external diaphragm, the lengthened elastomeric conduit in fluid flow with the rigid external tube such that the non-compressible fluid fills the lengthened elastomeric conduit; wherein the elastomeric conduit is formed of a flexible material such that movement of the elastomeric conduit in response to flow of a material being measured, prevents residue buildup upon the external diaphragm;

e) a mounting for mounting the lengthened elastomeric conduit such that at least a portion of the lengthened elastomeric conduit is immersed in a material in need of pressure measurement;

wherein pressure exerted by the material undergoing measurement, is transmitted via the external diaphragm, through the non-compressible liquid to the internal diaphragm, and deformation of said internal diaphragm is measured by said pressure measuring mechanism and displayed upon said display.

Moreover, in some cases, the mounting positions said lengthened elastomeric conduit at an angle in said material in need of pressure measurement, and said angle is measurable compared to the direction of flow of said material. Optionally the angle is variable.

Further, in some instances the lengthened elastomeric conduit is viscoelastic.

Optionally, the viscoelastic material selected, generates vibrations of said lengthened elastomeric conduit in response to flow of said material being measured.

Moreover, optionally, the lengthened elastomeric conduit is formed of a material selected from: nitrile rubber (NBR), silicone, EPDM rubber, HNBR, and Viton®.

Still further, in some instances, a portion of said lengthened elastomeric conduit functions as said external diaphragm.

Optionally, the invention comprises hydro-dynamic elements configured to generate a force from flow of a material being measured.

In some cases the mounting is flexible.

Further, the mounting may include a spring for providing freedom of movement of said mounting.

The invention also provides a kit for retrofitting a pressure sensor having an internal deformable diaphragm, said kit comprising:

a) a lengthened elastomeric conduit having an external diaphragm;
b) a non-compressible fluid for filling said elastomeric conduit;
c) a mounting configured to secure said lengthened elastomeric conduit at least partially immersed in a material undergoing pressure measurement; wherein said mounting is further configured to secure said lengthened elastomeric conduit in fluid flow with at least one non-compressible fluid, such that pressure exerted by said material undergoing measurement, is transmitted via said external diaphragm, through said non-compressible liquid to an internal diaphragm of a pressure sensor, to allow measurement of the deformation of said internal diaphragm.

In some embodiments of the kit, the lengthened elastomeric conduit is pre-filled with said non-compressible fluid.

Optionally, said lengthened elastomeric conduit is formed of a material selected from: nitrile rubber (NBR), silicone, EPDM rubber, HNBR, and Viton®.

Further, in some cases the elastomeric conduit is formed of a flexible material such that movement of said elastomeric conduit in response to flow of a material being measured, prevents residue buildup upon said external diaphragm.

In addition to the exemplary aspects and embodiments described above, further aspects and embodiments will become apparent by reference to the figures and by study of the following detailed description.

Glossary

In the present invention, the term "pressure measuring mechanism" used in reference to measurement of the deformation of an internal diaphragm, refers to: means that are used to analyze the degree of deformation of the internal diaphragm, and to relate the measured deformation of the internal diaphragm, to the pressure of a substance being measured. Non-limiting examples include: optical, electronic, or mechanical means. The pressure sensing element may be a Bourdon tube, a diaphragm, a capsule, or a set of bellows, which will change shape in response to the pressure of the region in question. The deflection of the pressure sensing element may be read by a linkage connected to a needle, or it may be read by a secondary transducer. Electronic measuring, may be done for instance, using any of the following gauges: a metal strain gauge, piezoresistive strain gauge, piezoresistive silicon pressure sensor, a capacitive gauge, magnetic piezoelectric, optical, potentiometric, and resonant gauges. Specific commercial non-limiting examples are found in the Examples hereinbelow.

In the present invention, the term "non-compressible fluid" refers to a fluid with constant density, or the change in density with pressure, is so small as to be considered negligible. Non-limiting examples include water, hydraulic fluids, and glycerin.

In the present invention, the term "material", used in relation to a substance undergoing pressure measurement, refers to any media, in various physical phases. Non-limiting examples include: gas, fluid, and viscous materials. The term "substance" is used interchangeably with the term "material".

BRIEF DESCRIPTION OF THE FIGURES

The present invention is illustrated by way of example in the figures of the accompanying drawings, in which like references indicate similar elements and in which.

DETAILED DESCRIPTION

Figure 1:
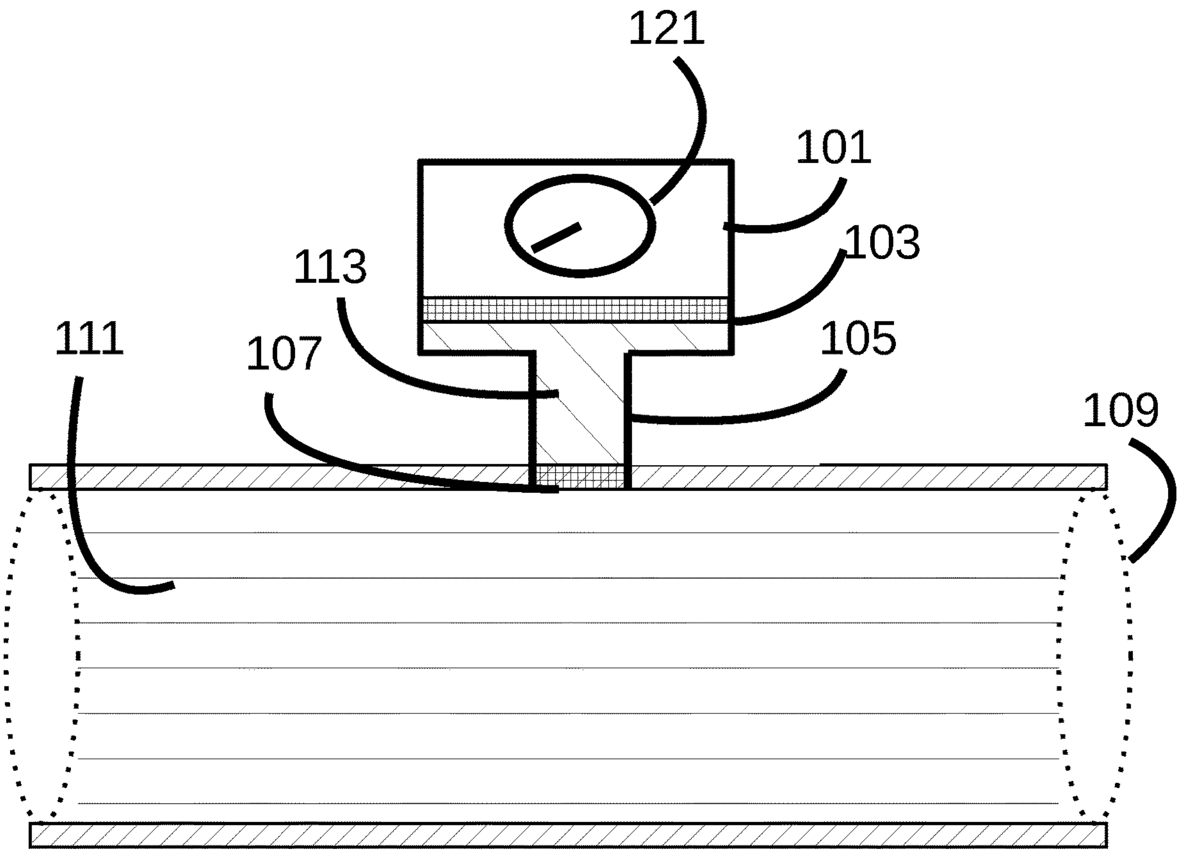
FIG. 1 PRIOR ART
FIG. 1 is a schematic cross section of a Prior Art flush mounted pressure sensor.

In the following detailed description, numerous specific details are set forth to provide a thorough understanding of the present invention. There is no intention to limit the invention to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description and should not be regarded as limiting.

The invention provides a pressure sensor, and a retrofit kit for a pressure sensor, that resolve the prior art problem of residue buildup on the external diaphragm that contacts the material being measured; thus, the invention is capable of functioning over an extended length of time.

In the following description, the invention is described in use to measure the pressure of a gas or a fluid flowing in a pipe, as these are common uses for pressure gauges. There is no intention to limit the scope of the invention to these uses, rather the invention may be used to measure any material in any phase of being, and in any location.

In a general overview, in order to prevent residue buildup from the substance being measured, on the external diaphragm, the invention provides a lengthened elastomeric conduit, which protrudes into the fluid/gas pipe. The elastomeric conduit is filled with a non-compressible fluid, and terminates in an external diaphragm. Without being bound by theory, the elastomeric nature of the conduit allows free movement of the conduit, in response to flow in the pipe, and thus dislodges any residue that initially contacts the external diaphragm. The invention is provided as a pressure sensor; or as a kit for retrofitting a prior art pressure sensor.

In one embodiment, the elastomeric conduit is angled compared to the direction of flow of the material being measured. The angle further prevents residue deposit.

Figure 2:
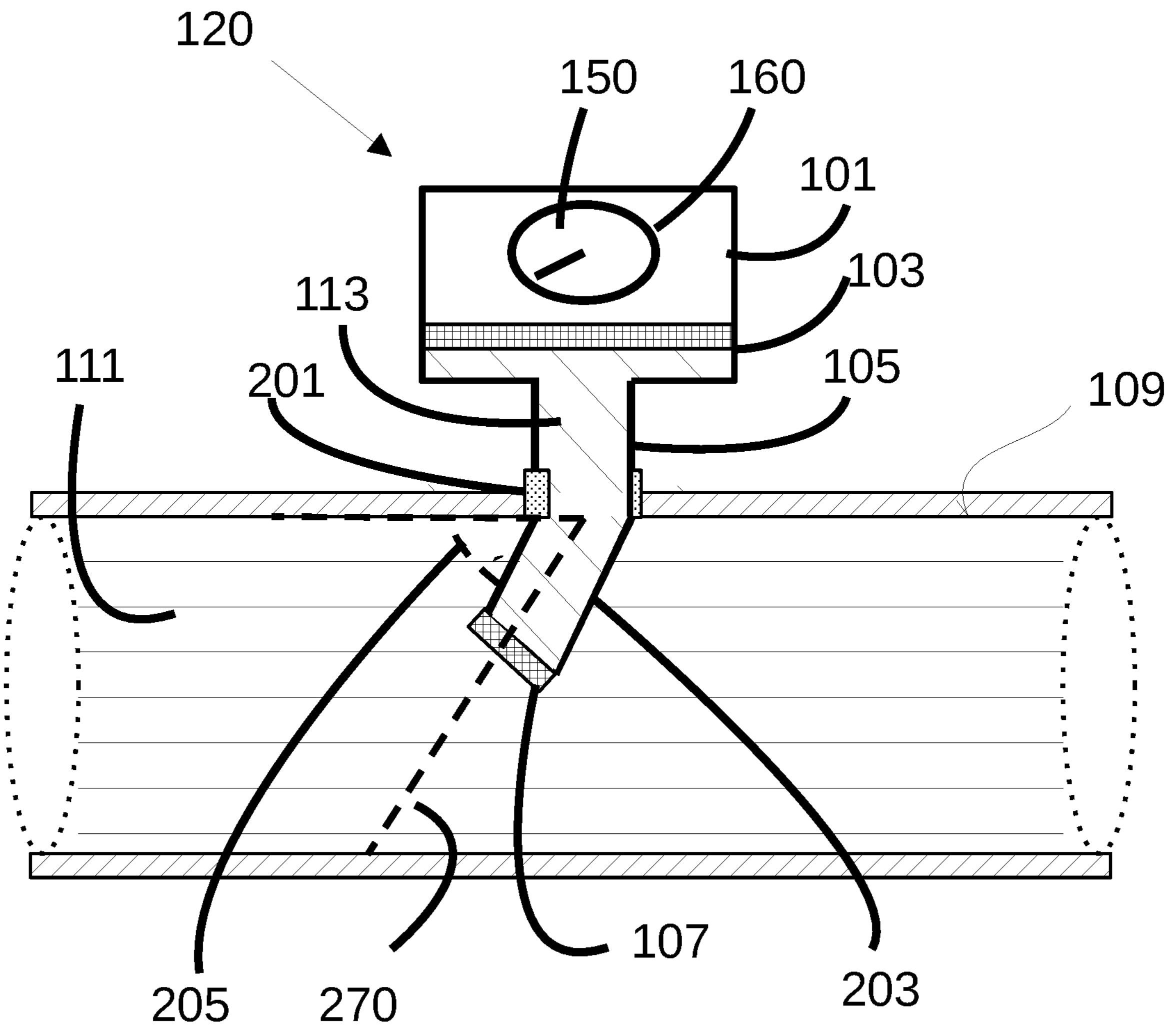
FIG. 2 is a schematic cross section of a pressure sensor of the invention.

Referring now in detail to FIG. 2, a schematic cross section is shown of the pressure sensor of the invention. The pressure sensor (120) is comprised of a housing (101), a pressure measuring mechanism (150), a display (160), an internal diaphragm (103), an external diaphragm (107), and a rigid external tube (105).

Mounting (201) connects rigid external tube (105) to lengthened elastomeric conduit (203) which extends into pipe (109) containing a fluid (111) to be measured. The lengthened elastomeric conduit (203) terminates in the external diaphragm (107). A non-compressible liquid (113) is contained between the internal diaphragm (103) and the external diaphragm (107). Any pressure exerted on the external diaphragm, by the fluid or gas (111) being measured in the pipe (109), will be transferred by the non-compressible fluid (113) to the internal diaphragm (103).

The internal diaphragm (103) deformation is then measured using the pressure measuring mechanism (150) which is any of: optical, electronic, or mechanical, as are well known in the art. The pressure being measured, for the fluid or gas (111) flowing in a pipe (109), is related to the measured deformation of the internal diaphragm (103).

As shown in FIG. 2, in one embodiment, lengthened elastomeric conduit (203) extends at an angle into pipe (109). The angle encourages dislodge of residues originating in the fluid being measured (111), from the outer side of the external diaphragm (107). Angle is indicated by dotted line (170). The angle may be constant or may vary depending on the strength of the flow of the fluid or gas (111) in the pipe (109). The angle may range from 0° to 180°.

In one embodiment, in order to obtain a constant angle (170), mounting (201) is rigid, and extends at an angle into the pipe (109) at the point of attachment to the elastomer. Alternatively, or additionally, the flow of fluid or gas in the pipe (109) past the lengthened elastomeric conduit (203), generates the angle (170) by sweeping the elastomeric conduit (203) in the direction of flow.

The elastomer chosen for the lengthened elastomeric conduit (203), as well as the thickness used, may effect the angle of the conduit (203).

Presently preferred materials for the lengthened elastomeric conduit (203), include the non-limiting examples: NBR (nitrile rubber), silicone, EPDM rubber (ethylene propylene diene monomer rubber), HNBR (hydrogenated nitrile rubber), and Viton® by DuPont. Any natural or synthetic polymer that is viscoelastic, may be utilized as the elastomer.

The lengthened elastomeric conduit (203) protrudes into the pipe (109) and may be fully or partially immersed in the fluid (111).

In an alternative embodiment the difference between the angle and direction of flow is equal or less than 90°.

In one alternative embodiment, the mounting (201) is dynamically configured: In one example, the mounting (201) has an internal spring mechanism to allow freedom of movement after its installation. Optionally, the mounting is formed of a material having inherent flexibility. Flow of a material (111) being measured, exerts a force on the lengthened elastomeric conduit (203), creating the angle (205) between the lengthened elastomeric conduit (203) and the pipe (109). As the rate of the fluid/gas (111) flow changes in the pipe, the angle (205) will change.

In some embodiments, the mounting (201) is either rigid at a defined angle (205), or is flexible around a defined angle (205). In a further embodiment, the defined angle can be any angle in range of 0° to 180°, and the flexibility around an angle (205) can range from any of but not limited to; +/−1°; +/−5°; +/−10°; or smaller than +/−25°.

Figure 3:
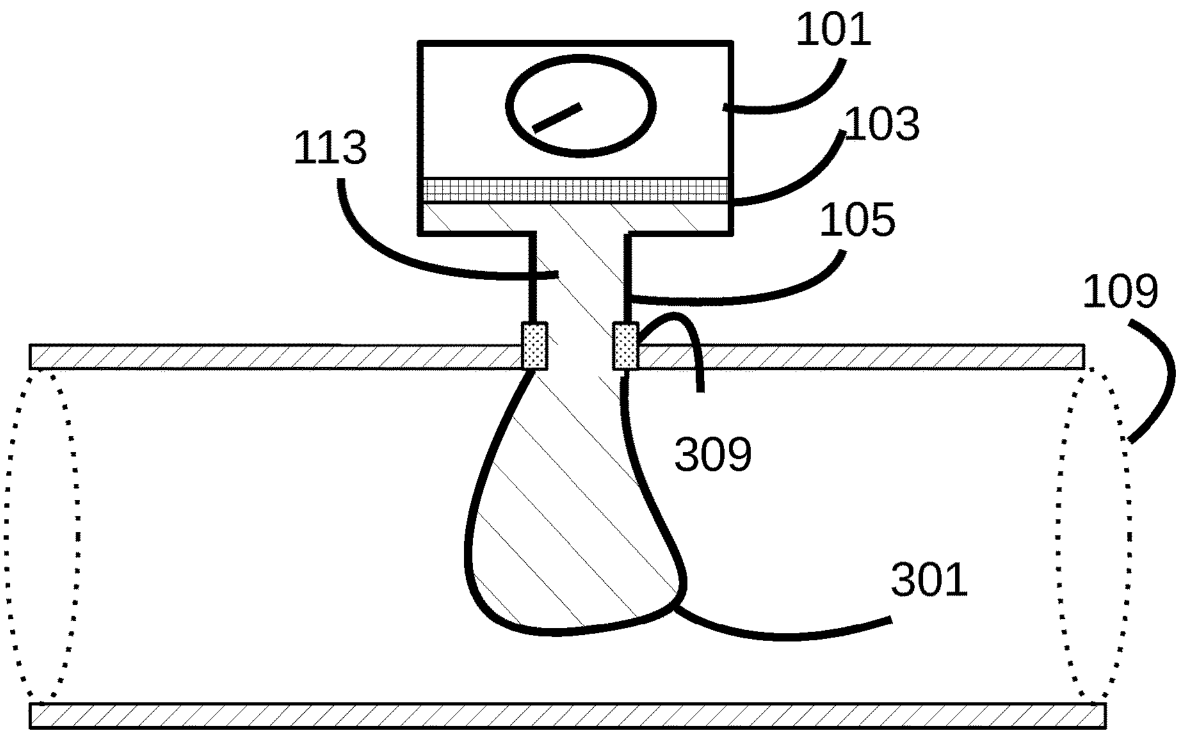
FIG. 3 is a schematic cross section of a second embodiment of the pressure sensor of the invention.

FIG. 3 is a schematic cross section of an alternative embodiment of the fluid pressure sensor of the invention. This embodiment differs from that shown in FIG. 2, in that the external diaphragm (207), has been replaced with an integral terminal portion of the lengthened elastomeric conduit (203), termed the flexible interface (301). The flexible interface (301) is a malleable surface, deformable by the pressure of the measured fluid in the pipe (109), the initial pressure of the non-compressible fluid (113), the Young modulus and the mechanical properties of the flexible interface (301).

Deformation of the flexible interface (301) by the fluid (111) being measured, is transmitted via the non-compressible fluid 113 to deformation of the internal diaphragm (103), which is measured by the pressure measuring mechanism (150).

In use of any of the embodiments of the invention, it may be necessary to adjust the pressure of the non-compressible fluid (113) after assembly of the fluid pressure sensor body (101) on a pipe (109). The base pressure of the non-compressible fluid (113) in the absence of a fluid in the pipe (109), may be set by any means: electrical, mechanical, fluidic actuation and a piston or pump mechanism. The base pressure may be set at any time, such as: prior to installation of pressure sensor on pipe (109), immediately after installation of pressure sensor on pipe (109), periodically after installation to remove debris by mechanical deformation of one or more flexible interfaces (301), and as a corrective measure after installation to remove debris by mechanical deformation of one or more flexible interfaces (301).

Figure 4:
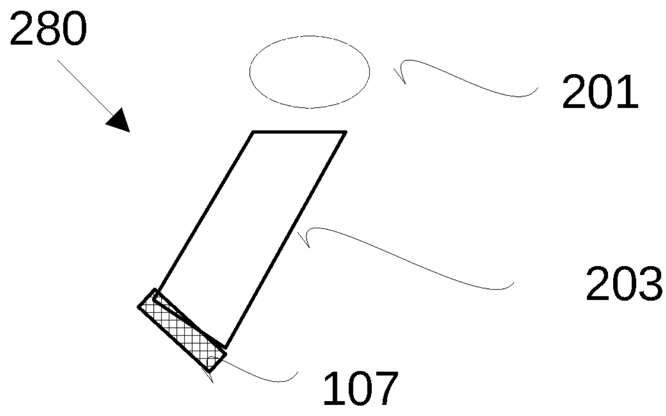
FIG. 4 is a schematic of a kit for retrofitting a prior art pressure sensor, including a lengthened elastomeric conduit, and a mounting.

Referring to FIG. 4, the invention additionally provides a kit 280 for retrofitting an existing pressure sensor. The kit 280 includes a lengthened elastomeric conduit (203) which terminates in an external diaphragm (107). The kit includes a mounting (201), for sealing the elastomeric conduit (203) upon an existing pressure sensor (after filling of conduit with non-compressible liquid, not shown).

Figure 5:
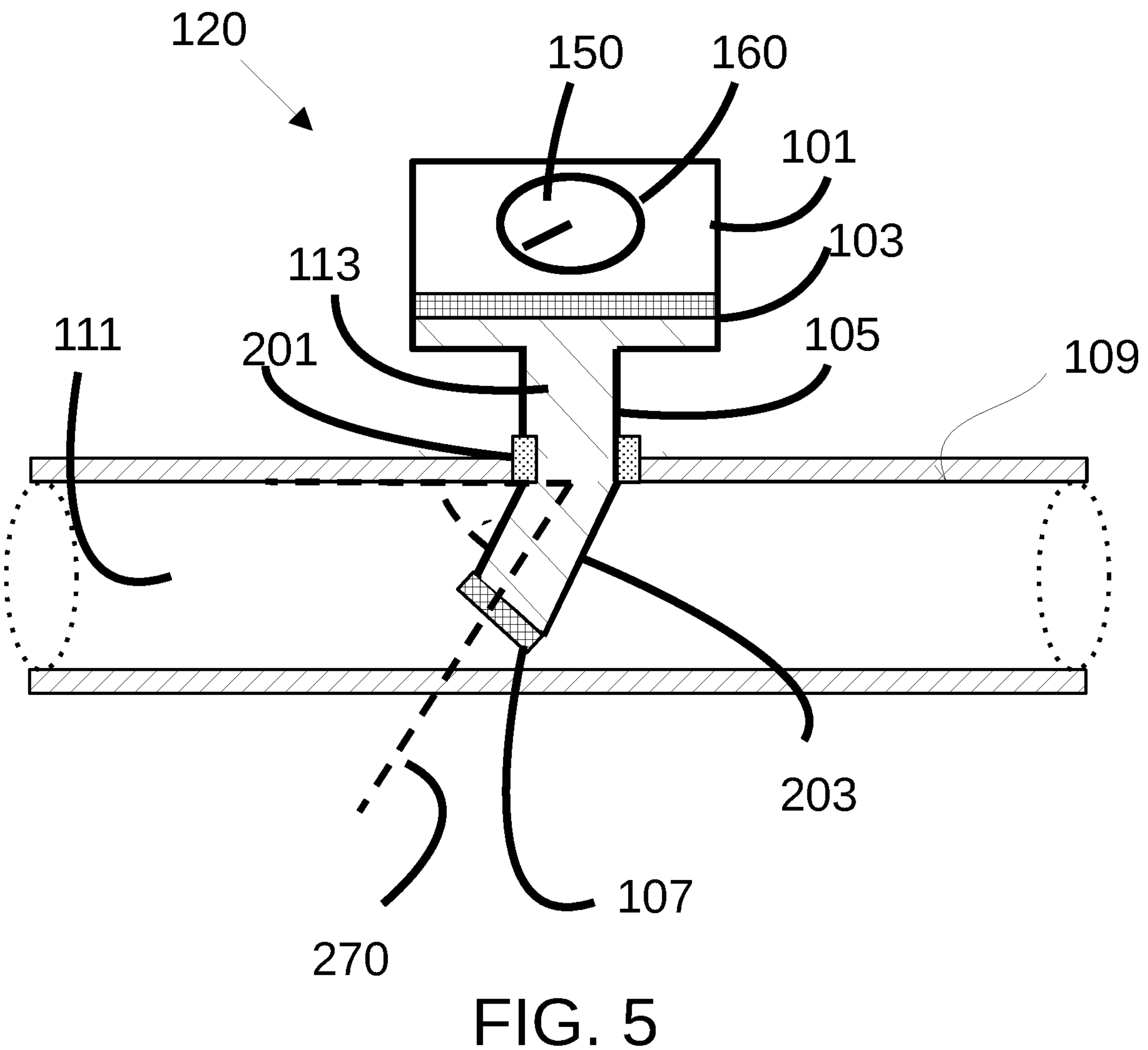
FIG. 5 is a schematic cross section of a retrofit kit of the invention, after it has been installed upon a prior art pressure sensor.

Mounting (201) may be of the threaded screw variety, configured to mate with pipe (109) and with rigid external tube (105) of Prior art pressure sensor (shown in FIG. 5). Optionally O-rings may be included, to improve the seal.

Referring to FIG. 5, kit 280 has been installed upon a prior art pressure sensor. Installation of the upgrade kit may be done for instance, by removing a flush mounted pressure sensor from the pipe (109). Providing an upgrade kit which includes at least one mounting (201) at least one lengthened elastomeric conduit (203), and external diaphragm (107). Filling the non-compressible fluid, and mounting the upgraded pressure sensor on the pipe (109). The elastomeric conduit (203) is mounted so as to protrude at least partially into the fluid-filled pipe, with at least one portion of the elastomeric conduit configured as the external diaphragm. Deformation of the internal diaphragm (103) is then measured, using optical, electronic, or mechanical means; the pressure of the fluid (111) in the pipe (109) is related to the measured deformation of the internal diaphragm (103).

Figure 6:
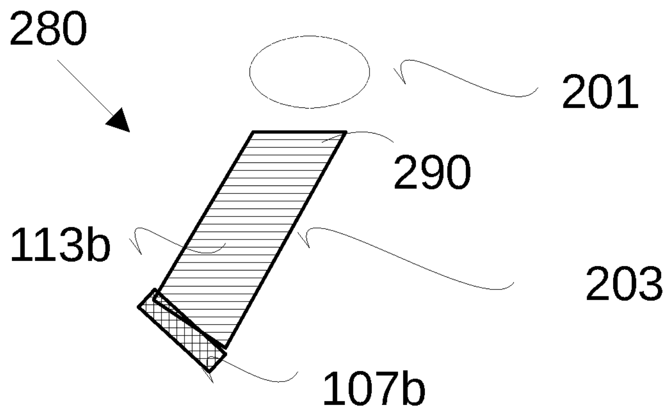
FIG. 6 is a schematic of another embodiment of a kit for retrofitting a prior art pressure sensor; in which the lengthened elastomeric conduit is prefilled with non-compressible fluid.
Figure 7:
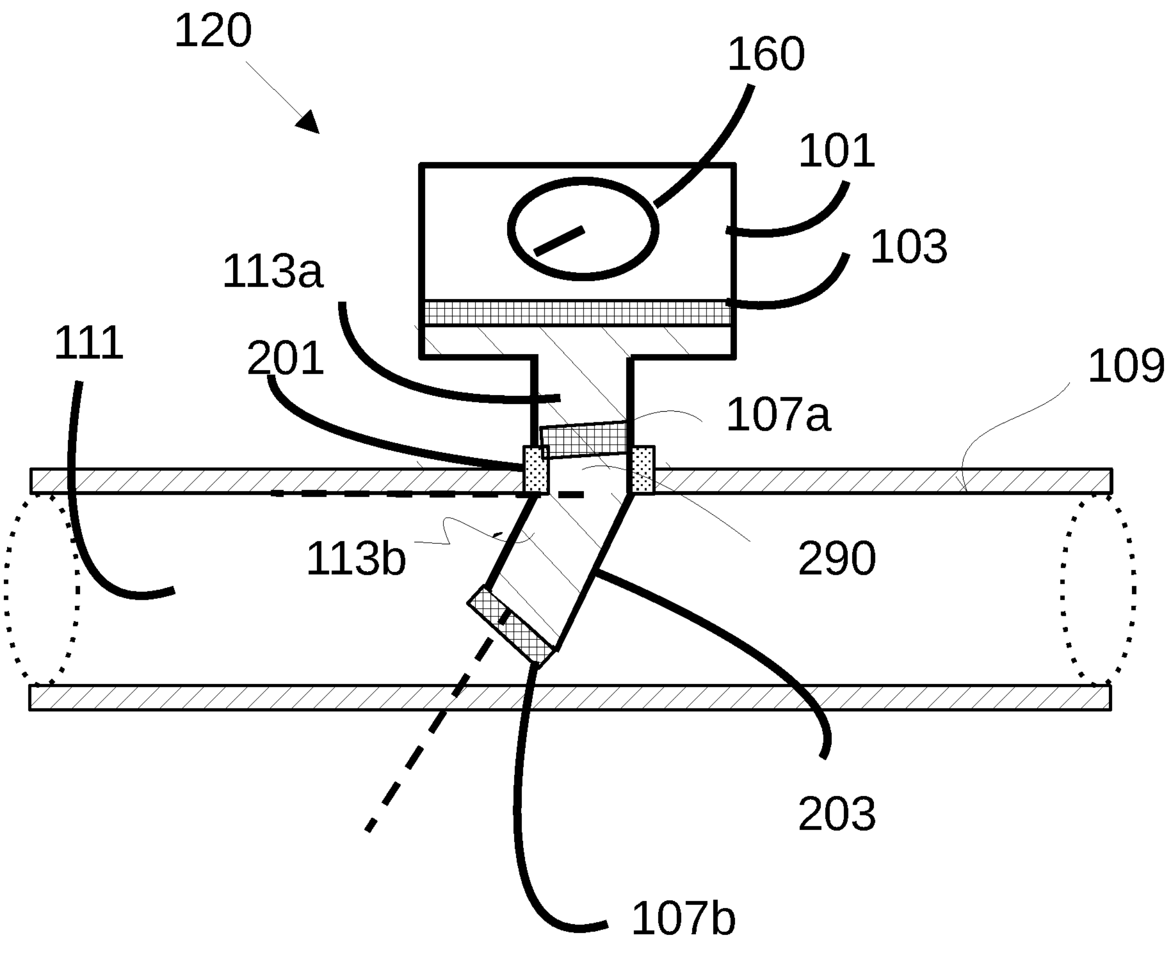
FIG. 7 is a schematic cross section of the prefilled retrofit kit of the invention, after it has been installed upon a prior art pressure sensor.

Referring to FIGS. 6-7, in an alternative embodiment, the kit 280 for retrofitting a prior art pressure sensor, comprises a lengthened elastomeric conduit (203) which is pre-filled with a non-compressible fluid (113*b*). The elastomeric conduit (203) terminates in an external diaphragm 107*b* which will be immersed into a fluid being measured. An upper end 290 of the elastomeric conduit (203) will be held by mounting 201, which is provided as part of kit 280.

Referring to FIG. 7, the kit 280 is mounted upon a prior art pressure sensor, so that the upper end 290 of the elastomeric conduit (203) contacts the prior art external diaphragm 107*a* of the pressure sensor. Any pressure that is exerted by the fluid 111 being measured in the pipe (109), will be transmitted via preloaded non-compressible fluid (113*b*) to the diaphragm (107*a*), to non-compressible liquid (113*a*) of prior art pressure sensor, and to internal diaphragm (103). Deformation of the internal diaphragm (103) is then measured, using optical, electronic, or mechanical means;

the pressure of the fluid (111) in the pipe (109) is related to the measured deformation of the internal diaphragm (103).

EXAMPLES

Example 1

A retrofit kit described in relation to FIGS. 4-5 was installed upon a "Diaphragm pressure gauge in chemical version" manufactured by Baumer Ltd. of Southington CT, USA (Product Code DPx100). The kit included lengthened elastomeric conduit made of Viton®, and stainless-steel threaded screw type mounting. O-rings were utilized to seal mounting to a fluid-flow pipe containing a fluid to be measured.

The Baumer Pressure gauge selected includes an over-pressure safety, with an open lower flange. The gauge measures pressure ranges of, 0.4 to 25 bar (for flange ø 100 mm) or 60 to 250 mbar (for flange ø 150 mm). The dampening liquid is glycerin 86%. The retrofitted pressure gauge, after installation of kit, was able to accurately detect the pressure of sewage in a central municipal pipe, without clogging. Visual examination after several weeks of use did not detect residue buildup upon the external diaphragm.

Example 2

The retrofit kit described in relation to FIGS. 6-7 was installed upon a Crytal Pressure "M1m" digital gauge, manufactured by Ametek Inc (Ametek STC, global corporation). Digital gauge was battery powered, with LCD; diaphragm seal fluid is silicone oil.

Kit included lengthened elastomeric conduit made of silicone, prefilled with a non-compressible fluid, and stainless-steel threaded screw type mounting. O-rings were utilized to seal mounting to a fluid-flow pipe containing a fluid to be measured.

Example 3

A retrofit kit described in relation to FIGS. 4-5 was installed on a Bourdon tube pressure gauge, copper alloy manufactured by WIKA Alexander Wiegand SE & Co. KG of Klingenberg Germany (any of Models 111.10, 111.12).

Without being bound by theory, when measuring the pressure in the pipe, in addition to applying pressure on the fluid pressure sensor elements protruding into the pipe, the fluid flow also imparts a force (F) on the fluid pressure sensor elements protruding into the pipe. As a result of the force (F) action, the fluid pressure elements may experience a local or global movement. A local movement implies a local deformation of one or more of the immersed elements of the pressure sensor, and a global movement implies a movement of any of the elements of the fluid pressure sensor. Resonance may occur in the lengthened elastomeric conduit, or in the external diaphragm, due to the interaction between the masses (m), and the spring constants (k), where the resonance frequency (f) is given by $$f = \frac{1}{2\pi}\sqrt{\frac{k}{m}}$$

and the quality factor (Q) is given by $$Q = \frac{\sqrt{mk}}{D},$$

where D is the damping coefficient. A local or global movement may result in vibrations of the lengthened elastomeric conduit, such that maximal vibrations occur at the mechanical resonance frequency. These vibrations may aid in preventing accumulation of residue upon the immersed lengthened elastomeric conduit and external diaphragm.

In an additional embodiment, one or more of the elements of the pressure sensor protruding into the pipe are constructed have a mass and or spring constant so at least one resonance frequency which prevents buildup of residue on the one or more pressure sensor elements protruding into the pipe and especially any of the flexible interfaces or external diaphragm. The long-term reliability of the pressure sensor measurement is enhanced by reduction of residue buildup due to the resonance mechanical vibrations.

In a further embodiment the external tube includes one or more hydro-dynamic elements configured to generate a force from the fluid flow. The hydro-dynamic elements enhance the vibrations generated in the external tube from the fluid flow.

In summary, the pressure sensors and retrofit kits of the invention, continuously function even in turbid fluids; and prevent scum accumulation on the lengthened elastomeric conduit and external diaphragm, that would interfere with pressure measurement. The functionality and reliability of the pressure measurement is thus considerably extended.

Having described the invention with regard to certain specific embodiments thereof, it is to be understood that the description is not meant as a limitation, as further modifications will now become apparent to those skilled in the art, and it is intended to cover such modifications as are within the scope of the appended claims.

The invention claimed is:

1. A pressure sensor configured to measure the pressure of a material, said pressure sensor comprising:

a) a housing, enclosing a pressure measuring mechanism and a display;

b) a rigid external tube, filled with a non-compressible fluid;

c) a deformable internal diaphragm having a first side in contact with said pressure measuring mechanism and a second side in contact with said non-compressible fluid;

d) a lengthened elastomeric conduit, having an external diaphragm, said lengthened elastomeric conduit in fluid flow with said rigid external tube such that said non-compressible fluid fills said lengthened elastomeric conduit;

wherein said elastomeric conduit is formed of a flexible material such that movement of said elastomeric conduit in response to flow of a material being measured, prevents residue buildup upon said external diaphragm;

e) a mounting for mounting said lengthened elastomeric conduit such that at least a portion of said lengthened elastomeric conduit is immersed in a material in need of pressure measurement;

wherein pressure exerted by said material undergoing measurement, is transmitted via said external diaphragm, through said non-compressible liquid fluid to said internal diaphragm, and deformation of said internal diaphragm is measured by said pressure measuring mechanism and displayed upon said display.

2. The pressure sensor of claim 1, wherein said mounting positions said lengthened elastomeric conduit at an angle in said material in need of pressure measurement, and said angle is measurable compared to the direction of flow of said material.

3. The pressure sensor of claim 2, wherein said angle is variable.

4. The pressure sensor of claim 1, wherein said lengthened elastomeric conduit is viscoelastic.

5. The pressure sensor of claim 4, wherein said viscoelastic material selected generates vibrations of said lengthened elastomeric conduit in response to flow of said material being measured.

6. The pressure sensor of claim 1, wherein said material undergoing measurement is selected from: a gas, a fluid and a viscous material.

7. The pressure sensor of claim 1, wherein said material undergoing measurement is located in a flow pipe.

8. The pressure sensor of claim 1, wherein said lengthened elastomeric conduit is formed of a material selected from: nitrile rubber (NBR), silicone, EPDM rubber, HNBR, and Viton®.

9. The pressure sensor of claim 1, wherein a portion of said lengthened elastomeric conduit functions as said external diaphragm.

10. The pressure sensor of claim 1, further comprising hydro-dynamic elements on said lengthened elastomeric conduit configured to generate a force from flow of a material being measured.

11. The pressure sensor of claim 1, wherein said mounting is flexible.

12. The pressure sensor of claim 1, wherein said mounting includes a spring for providing freedom of movement of said mounting.

13. A kit for retrofitting a pressure sensor having an internal deformable diaphragm, said kit comprising:

a) a lengthened elastomeric conduit having an external diaphragm;

b) a non-compressible fluid for filling said elastomeric conduit;

c) a mounting configured to secure said lengthened elastomeric conduit at least partially immersed in a material undergoing pressure measurement; wherein said mounting is further configured to secure said lengthened elastomeric conduit in fluid flow with at least one non-compressible fluid, such that pressure exerted by said material undergoing measurement, is transmitted via said external diaphragm, through said non-compressible liquid fluid to an internal diaphragm of a pressure sensor, to allow measurement of the deformation of said internal diaphragm;

wherein said elastomeric conduit is formed of a flexible material such that movement of said elastomeric conduit in response to flow of a material being measured, prevents residue buildup upon said external diaphragm.

14. The kit of claim 13, wherein said lengthened elastomeric conduit is pre-filled with said non-compressible fluid.

15. The kit of claim 13, wherein said lengthened elastomeric conduit is formed of a material selected from: nitrile rubber (NBR), silicone, EPDM rubber, HNBR, and Viton®.

* * * * *